UNITED STATES PATENT OFFICE.

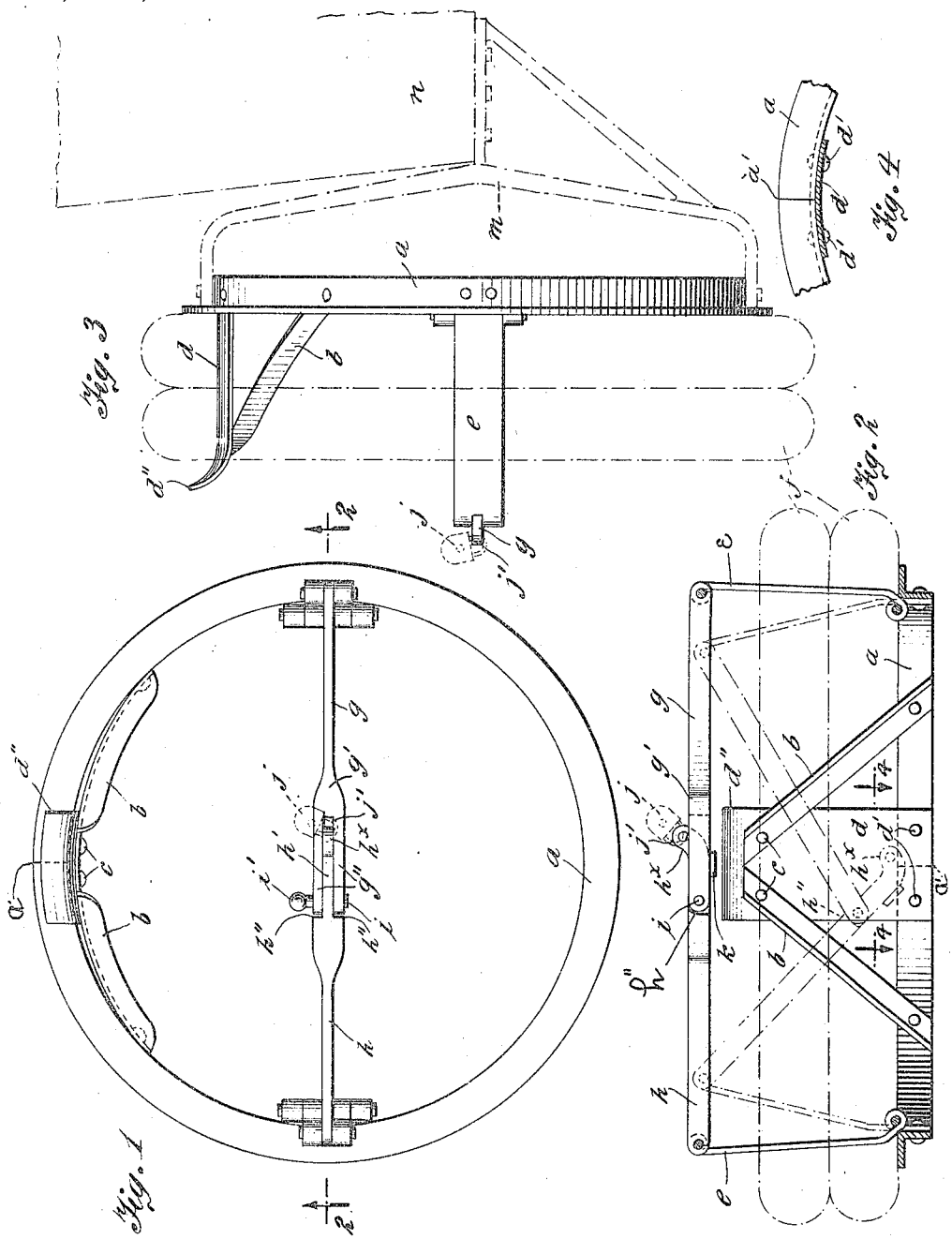

EDWARD DOWNING, OF SAN FRANCISCO, CALIFORNIA, ASSIGNOR TO LLEWELYN ARTHUR NARES, OF FRESNO, CALIFORNIA.

AUTOMOBILE-TIRE RACK.

1,197,272.  Specification of Letters Patent.  Patented Sept. 5, 1916.

Application filed February 21, 1916. Serial No. 79,753.

*To all whom it may concern:*

Be it known that I, EDWARD DOWNING, a citizen of the United States of America, residing at San Francisco, in the county of San Francisco and State of California, have invented certain new and useful Improvements in Automobile-Tire Racks, of which the following is a specification, reference being had to the accompanying drawings.

This invention relates to improvements in automobile tire-racks and particularly to improvements in the tire-rack described and shown in United States Patent No. 1,150,696 granted Llewelyn Arthur Nares, August 17, 1915; and an object of this invention is to simplify and cheapen the construction of the tire-rack disclosed in the above-named patent.

In the drawings illustrating the principle of this invention and the best mode now known to me of applying that principle, Figure 1 is a front elevation of my new tire-rack; Fig. 2 is a section on the line 2—2 of Fig. 1; Fig. 3 is a side elevation; and Fig. 4 is a section on the line 4—4 of Fig. 2.

To the base-ring $a$ there are fastened the inner ends of a pair of inclined braces $b$ the outer ends of which are secured, as by the rivets $c$, to the stationary tire supporting arm $d$ which projects laterally from the base-ring $a$. At its outer end, the arm $d$ is formed with a lip $d''$, while, at its inner end, the arm $d$ is fastened to the base-ring $a$, as by the rivets $d'$. In making this base-ring $a$, the ends of the ring-formed bar may be welded together at the meeting-point $a'$ of these ends (Fig. 4) and the rivets $d'$ are inserted in the base-ring $a$ on opposite sides of the meeting-point $a'$; hence, rupture of the ring thereat is safeguarded against not only by welding the ends of the ring-formed bar but also by fastening the latter ends to the inner end of the stationary arm $d$. At diametrically-opposite points on the base-ring $a$, there is hingedly fastened to the same a pair of laterally-projecting spring arms $e$ which act as locking arms for retaining the tires $f$ in place. The outer ends of these spring locking arms $e$ are connected by toggle-links or link-arms $g$, $h$, the outer ends of which are pivotally fastened to the outer ends of the spring locking arms $e$. The inner end $g'$ of the toggle-link $g$ is forked or bifurcated and the inner end $h'$ of the toggle-link $h$ is shaped to enter between the forks or branches $g''$ of the end $g'$ of the coöperating toggle-link $g$ (Fig. 1). The branches or fingers $g''$ and the inner end $h'$ are formed with holes adapted to receive the pivot-pin $i$ one end of which is formed with a knob or head $i'$ that enables the operator to grasp the pivot-pin $i$ and to force the inner ends $g'$, $h'$, inwardly for the purpose of releasing the tires $f$ (see dotted-line position of Fig. 2). The extremity of the inner end $h'$ is curved to form an ear $h^x$ that projects outside of the branches $g''$ and is formed with a hole designed to receive the bow $j'$ of a small padlock $j$ by means of which the toggle-links $g$, $h$, are held in horizontal position and the tires $f$ are held locked on the tire-rack by the locking arms $e$. The toggle-link $h$ is formed with a stop-lug $k$ which limits the outward throw of the toggle-links $g$, $h$. When the toggle-links $g$, $h$, lie in the horizontal position shown in Fig. 2, the locking arms $e$ flare outwardly slightly; and these locking arms $e$ being spring arms, they yield, by reason of their resiliency, when forced against the inner rim of the tires $f$, and there is thereby created sufficient frictional resistance between the arms $e$ and the tires $f$ to insure that the latter will be securely held on the tire-rack. It is obvious that, if desired, the ends of the ring-formed bar $a$ need not be welded at their meeting-point $a'$, in which case these ends will be held together by the rivets $d'$ that fasten the arm $d$ to the base-ring $a$.

The tire-rack may be mounted in a bracket $m$ mounted on the vehicle-body $n$.

As best shown in Fig. 1, the link-arm $h$ is enlarged near its inner end $h'$ and the latter is formed with a pair of shoulders $h''$ which engage the fingers or forks $g''$, when the link-arms $g$, $h$, are forced inwardly or toward the vehicle-body $n$ to release the tires $f$; and, by thus engaging the shoulders $h''$, the inward movement of the inner ends $g'$, $h'$, of the link-arms $g$, $h$, is limited and the striking of the vehicle-body $n$ by the ear $h^x$ is prevented.

I regard the provision of the shoulders $h''$, the fastening together of the ends of the ring-formed bar $a$ by the tire-supporting arm $d$ and the provision of the outwardly-flaring spring locking-arms $e$ as decided improvements on the tire-rack disclosed by the above-named patent and as important features of this invention.

I claim:—

1. A tire-rack including a base-ring; a pair of locking-arms hingedly connected thereto and arranged to bear yieldingly and to press frictionally against the tires; a pair of toggle link-arms connected to the outer ends of said locking-arms; a pivot-pin which is formed with a head for manual operation in swinging said link-arms, said pivot-pin connecting the latter pivotally at their opposed ends; and means for holding said link-arms in operative position.

2. A tire-rack including a base-ring; a pair of locking-arms hingedly connected thereto; a pair of link-arms connecting said locking-arms; means for holding said link-arms in operative position; and a stationary tire-supporting arm which is fastened to the end-portions of said base-ring and which fastens said end-portions together.

3. A tire-rack including a base-ring; a pair of locking-arms hingedly connected to said base-ring and arranged to bear against the tires; a pair of link-arms connected to the outer ends of said locking-arms, the inner end of one of said link-arms being formed with a shoulder with which the inner end of the other link-arm engages to limit the inward swing of said link-arms; and means for holding the latter in operative position.

Signed at the borough of Manhattan, city, county and State of New York, this sixteenth day of February, A. D. 1916, in the presence of the two undersigned witnesses.

EDWARD DOWNING.

Witnesses:
  JAMES HAMILTON,
  M. E. WOARDELL.